Aug. 22, 1967  N. GILADI  3,337,000
AERIAL PLATFORM FOR PICKING FRUIT
Filed Jan. 26, 1966  2 Sheets-Sheet 1

INVENTOR
NACHMAN GILADI
BY *Benjamin J. Barish*
ATTORNEY

Aug. 22, 1967   N. GILADI   3,337,000
AERIAL PLATFORM FOR PICKING FRUIT
Filed Jan. 26, 1966   2 Sheets-Sheet 2
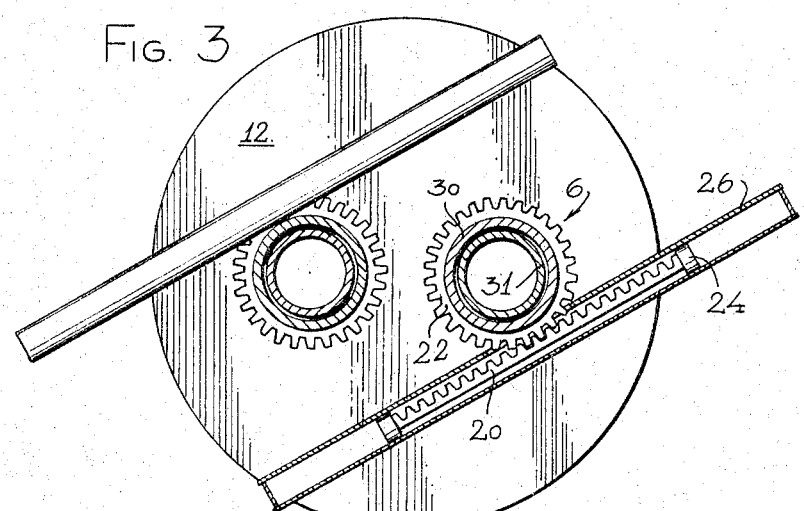
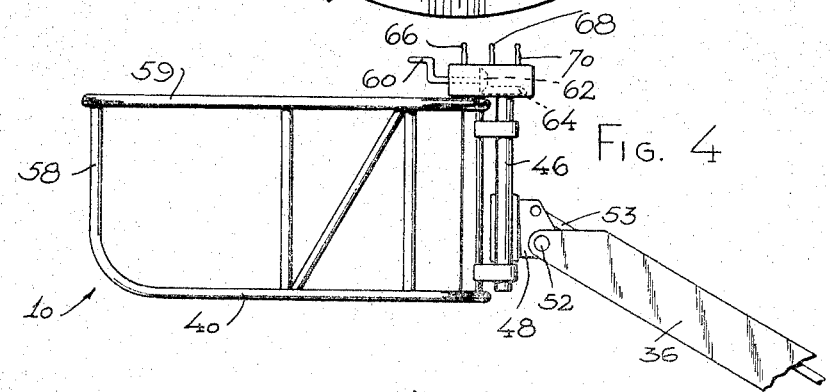
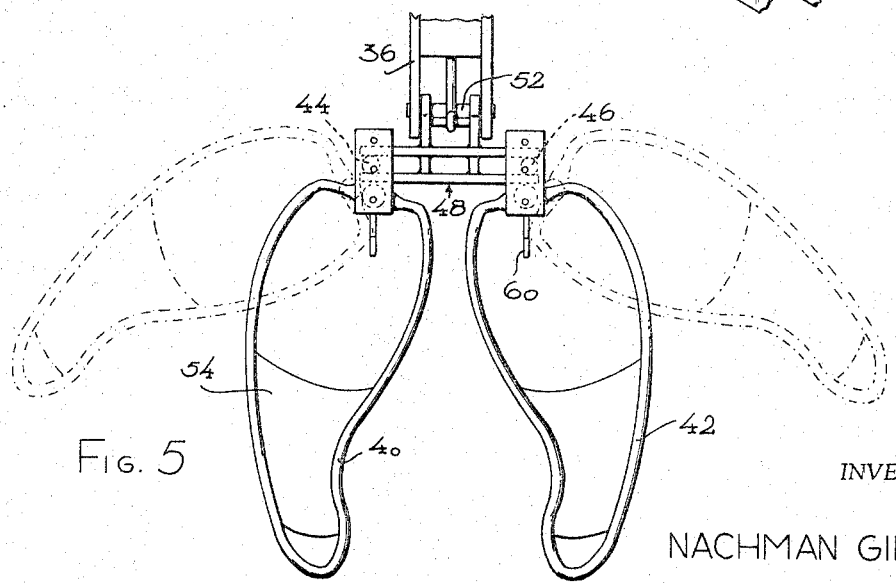
INVENTOR
NACHMAN GILADI
BY
ATTORNEY

United States Patent Office 3,337,000
Patented Aug. 22, 1967

3,337,000
AERIAL PLATFORM FOR PICKING FRUIT
Nachman Giladi, Kfar Giladi, Galil Elyon, Israel
Filed Jan. 26, 1966, Ser. No. 523,206
Claims priority, application Israel, Feb. 3, 1965,
22,911
3 Claims. (Cl. 182—148)

ABSTRACT OF THE DISCLOSURE

An aerial platform for picking fruit includes a mobile unit, a rotatable horizontal bed, a pair of rotatable booms mounted on the bed including a drive for each boom, and a pair of platforms pivotably mounted at the upper end of each boom. The drive for rotating the booms comprises a cylinder for each boom carried by the rotatable bed, a pair of pistons disposed in each cylinder, a rack for each boom disposed within the cylinder and between the pair of pistons, and a gear carried by each boom and meshing with its rack.

The present invention relates to apparatus particularly useful for picking fruit or for otherwise working with trees, an object of the present invention being to provide an improved aerial platform apparatus which is especially, but not exclusively, suited for this purpose.

According to one feature of the present invention, the apparatus includes a pair of movable booms supported at one end on a rotatable platform of a mobile unit. Each boom carries at its opposite end a pair of platforms each capable of supporting at least one worker and both pivotably mounted so as to be swingable toward and away from each other.

Further features and advantages of the invention will be apparent from the description below.

The invention is herein described with reference to the accompanying drawings which illustrate, somewhat diagrammatically and by way of example only, a preferred embodiment of the invention. In the drawings:

FIG. 3 is a top sectional view of the portion shown in FIG. 2;

FIG. 4 is a view showing the mounting of one of the platforms; and

FIG. 5 is a top plan view showing the mounting of a pair of platforms from one boom.

Figure 1:
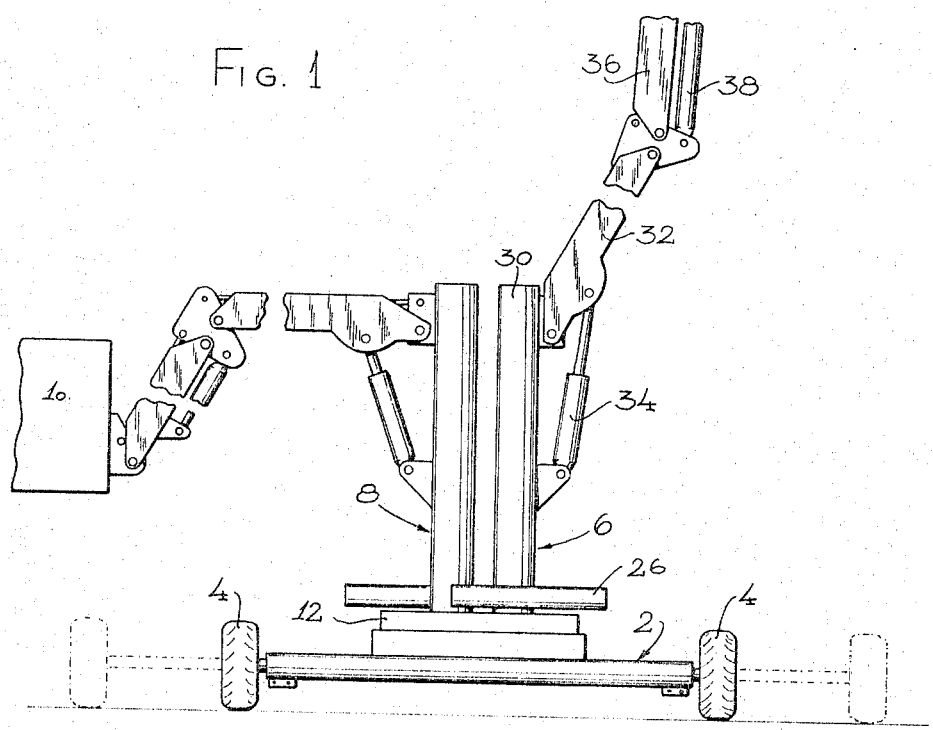
FIG. 1 is a front elevational view, partly broken away, of one form of apparatus constructed in accordance with the invention.
Figure 2:
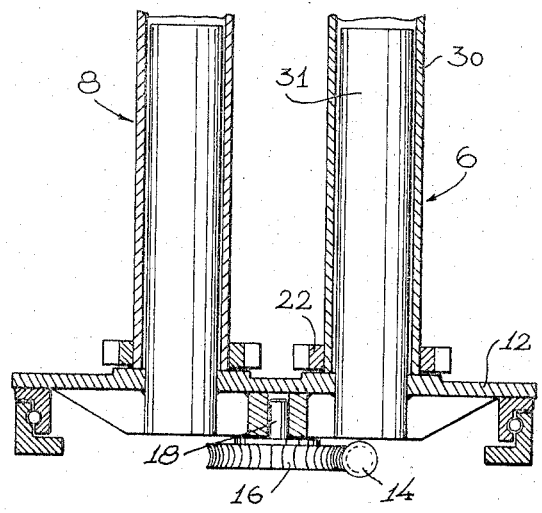
FIG. 2 is an enlarged sectional view of a portion of FIG. 1 showing the mounting for the booms.

With reference first to FIG. 1, the apparatus, generally designated as 2, is illustrated as a part of or attachment to a self-propelled tractor or other mobile unit, including wheels 4 which may be extended as shown in dotted lines to provide a wide horizontal support for the apparatus. The apparatus comprises a pair of movable booms 6 and 8 carried at one end on the mobile unit and supporting a platform unit at the opposite end, only that for boom 8 being shown in FIG. 1 and designated 10.

Both booms 6 and 8 are supported on a horizontal bed 12 carried by the mobile unit which bed is rotatable by means of a worm gear 14 driven from the drive of the mobile unit and meshing with another gear 16 secured to rotatable bed 12 by axle 18.

Boom 6 (boom 8 being of similar construction) is rotatable on horizontal bed 12 by means of a rack 20 (FIG. 3) meshing with a gear 22 fixed to the lower end of the boom. Rack 20 is carried between a pair of pistons 24 disposed in a hydraulic cylinder 26, such that the introduction of the hydraulic fluid in one end of the cylinder causes the rack 20 to move in one direction, and the introduction of the hydraulic fluid in the opposite end causes the rack to move in the opposite direction. This reciprocating movement of rack 20 rotates boom 6 accordingly.

Each boom 6 and 8 is made of a plurality of articulated sections. In the described embodiment, there are three such sections for each boom. With reference to boom 6, these include tubular section 30 rotatably mounted to horizontal bed 12 in the manner described above and telescopingly received over base 31 fixed to bed 12; section 32 whose pivotable movement with respect to section 30 is controlled by hydraulic device 34; and section 36 whose pivotable movement with respect to section 32 is controlled by hydraulic device 38. The platform structure 10 is pivotably mounted to the free end of section 36.

The platform structure carried by each boom 6 and 8 comprises a pair of platforms 40 and 42, each pivotably mounted to a vertical pin 44 and 46, respectively, carried on a mounting assembly 48 pivoted at 52 to section 36 of the respective boom. A level control comprising a link 53 maintains the platforms in a horizontal plane, but may be actuated to tip the platforms, if desired.

Each of the platforms 40 and 42 carried by each section 36 is substantially kidney-shaped and is capable of supporting a worker who normally stands at the end 54 (the lower end as shown in FIG. 5) of the platform. The opposite end is open at the bottom and is adapted to support a sack for the fruit picked from the trees. Each platform includes a frame 58 and a horizontal railing 59 for the worker.

Each platform carries the control for pivoting it as well as for moving the sections of the booms 6 and 8 so as to maneuver the platforms to the desired locations. The control for pivoting the individual platform is in the form of a crank handle 60 adapted to rotate a gear 62 carried on the platform, the gear meshing with another gear 64 carried on the vertical pivot pin 44. Knobs 66 and 68 respectively control hydraulic devices 34 and 38 for articulating the sections of the goom, and knob 70 controls the hydraulic rack 20 for rotating the boom on the horizontal bed 12. The means for controlling worm gear 14 for rotating the bed on the mobile unit is preferably located in the mobile unit itself, as usually this control would be operated to position both booms at the desired location before the workers are hoisted on the platforms.

It will of course be appreciated that the controls could be carried only on one platform for each boom, or in any other convenient arrangement according to the application of the apparatus.

The foregoing arrangement has been found particularly advantageous when used for picking fruit or when otherwise working with trees. The double-platform arrangement carried by each boom enables the workers to maneuver themselves to straddle the tree so that they can work at both sides at the same time. By operating crank handles 60 each can swing the platform toward and away from the other so as to work with small or large trees, as the case may be. Horizontal bed 12 is rotatable 360°, and similarly each of the booms 6 and 8 are rotatable on the bed almost 360°, which arrangements make for a very high degree of maneuverability of the platforms with respect to the trees. Usually the two booms will be located on opposite sides of the path which the mobile unit takes, but they can be both located on the same side if desired.

It is to be understood that the described embodiment of the invention is illustrative only, and that many other embodiments, variations and applications of the invention, or the several features thereof disclosed, may be made without departing from the spirit or scope of the invention as defined in the following claims.

I claim:

1. Apparatus particularly useful for picking fruit or otherwise working with trees, comprising a mobile unit, a horizontal bed rotatably mounted on the mobile unit, drive means for rotating said horizontal bed, a pair of booms rotatably supported at their lower ends on said horizontal bed, drive means for individually rotating each of said booms, a pair of platforms carried at the upper end of each of said booms, each of said platforms being capable of supporting at least one worker, and means pivotably mounting each pair of said platforms to its boom.

2. Apparatus as defined in claim 1, wherein said drive means for individually rotating each of said booms comprises a cylinder for each boom carried by said rotatable horizontal bed, a pair of pistons disposed in each cylinder, a rack for each boom disposed within the cylinder and between the pair of pistons thereof, and a gear carried by each boom and meshing with the rack of its respective boom.

3. Apparatus as defined in claim 1, wherein said boom is made of a plurality of articulated sections and includes power means for selectively articulating each of said sections, said apparatus further including control means for rotating each boom and for articulating its sections, said control means being disposed on at least one platform carried by its respective boom.

References Cited

UNITED STATES PATENTS

| | | | |
|---|---|---|---|
| 2,798,623 | 7/1957 | Girardi | 182—2 |
| 2,815,250 | 12/1957 | Trump | 182—2 |
| 2,821,312 | 1/1958 | Wiegel | 182—2 |
| 2,996,140 | 8/1961 | Troche | 182—2 |
| 3,167,194 | 1/1965 | Davis | 214—138 |

REINALDO P. MACHADO, *Primary Examiner.*